(12) United States Patent
Williams

(10) Patent No.: US 7,004,294 B2
(45) Date of Patent: Feb. 28, 2006

(54) VIBRATION ABSORBER ASSEMBLY

(76) Inventor: Kenneth A. Williams, 506 N. Greenwood Ave., Clearwater, FL (US) 33517

( * ) Notice: Subject to any disclaimer, the term of this patent is extended or adjusted under 35 U.S.C. 154(b) by 42 days.

(21) Appl. No.: 10/355,074

(22) Filed: Jan. 31, 2003

(65) Prior Publication Data
US 2004/0149075 A1    Aug. 5, 2004

(51) Int. Cl.
F16F 7/10    (2006.01)
(52) U.S. Cl. ..................... 188/378; 74/574.2
(58) Field of Classification Search ............... 188/378, 188/379; 74/574, 573 R, 572.1, 574.2, 572.2, 74/572.4; 464/180
See application file for complete search history.

(56) References Cited

U.S. PATENT DOCUMENTS

| | | | | |
|---|---|---|---|---|
| 2,306,959 A | * | 12/1942 | Knibbe | 74/604 |
| 2,346,972 A | | 4/1944 | Kishline | |
| 5,295,411 A | * | 3/1994 | Speckhart | 74/574 |
| 5,533,422 A | * | 7/1996 | Speckhart | 74/573 R |
| 6,382,050 B1 | * | 5/2002 | Carlson et al. | 74/574 |
| 6,408,717 B1 | * | 6/2002 | Young et al. | 74/574 |
| 6,520,047 B1 | * | 2/2003 | Carlson et al. | 74/574 |
| 6,742,412 B1 | * | 6/2004 | Feldhaus et al. | 74/574 |
| 2002/0062713 A1 | * | 5/2002 | Feldhaus et al. | 74/574 |
| 2003/0000783 A1 | * | 1/2003 | Kanai et al. | 188/378 |
| 2003/0037636 A1 | * | 2/2003 | Kawata et al. | 74/574 |

FOREIGN PATENT DOCUMENTS

| | | | |
|---|---|---|---|
| DE | 19911560 | * | 9/2000 |
| GB | 2100389 | * | 12/1982 |

* cited by examiner

*Primary Examiner*—Devon C. Kramer
(74) *Attorney, Agent, or Firm*—Stuart J. Friedman

(57) ABSTRACT

A vibration absorber assembly including a disc shaped housing having a central rotational axis and a plurality of radially elongated cavities, and a plurality of movable masses, each movable mass being housed in, and movable within, one of the plurality of radially elongated cavities. The plurality of movable masses are movable in the plurality of radially elongated cavities to absorb torsional vibration, and/or alter moment of inertia of the vibration absorber assembly.

12 Claims, 12 Drawing Sheets

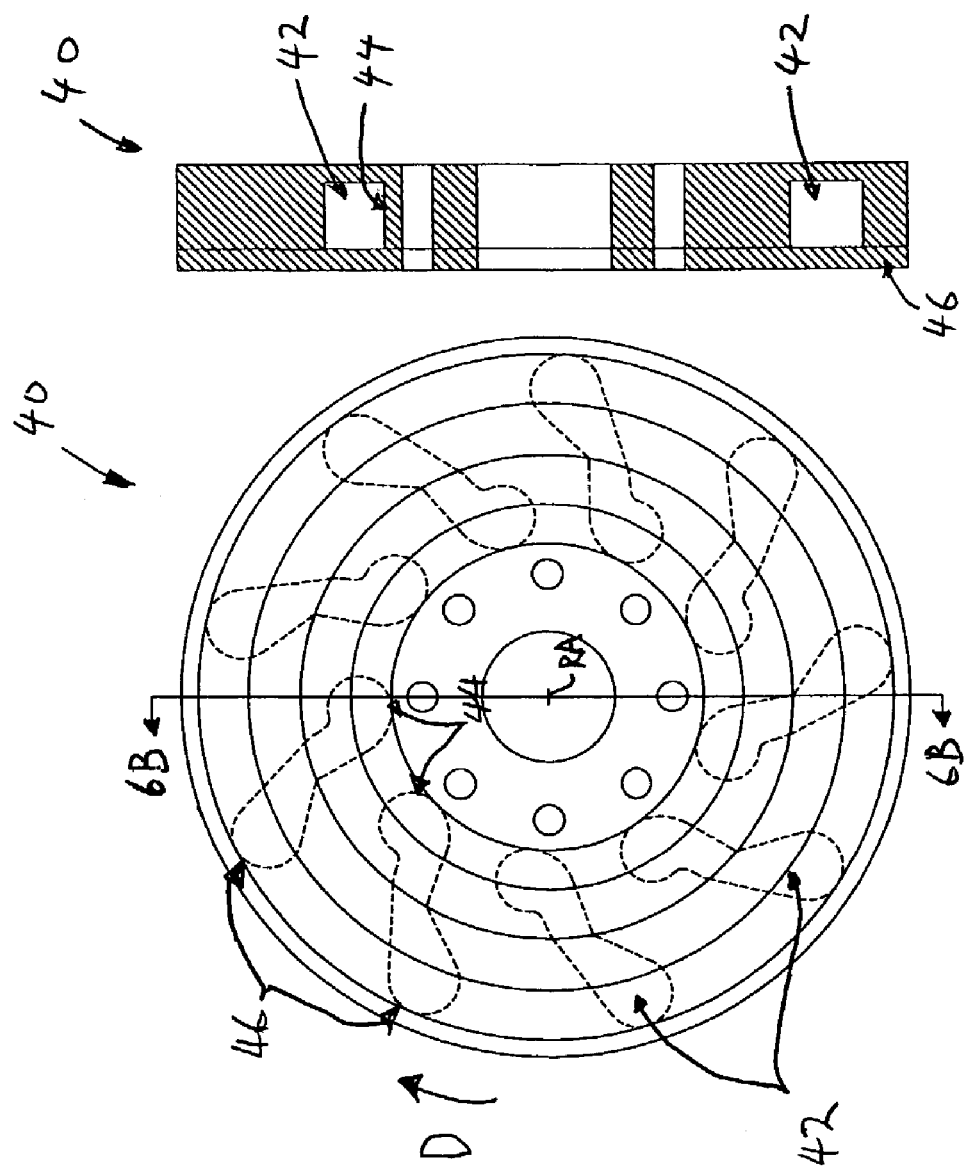

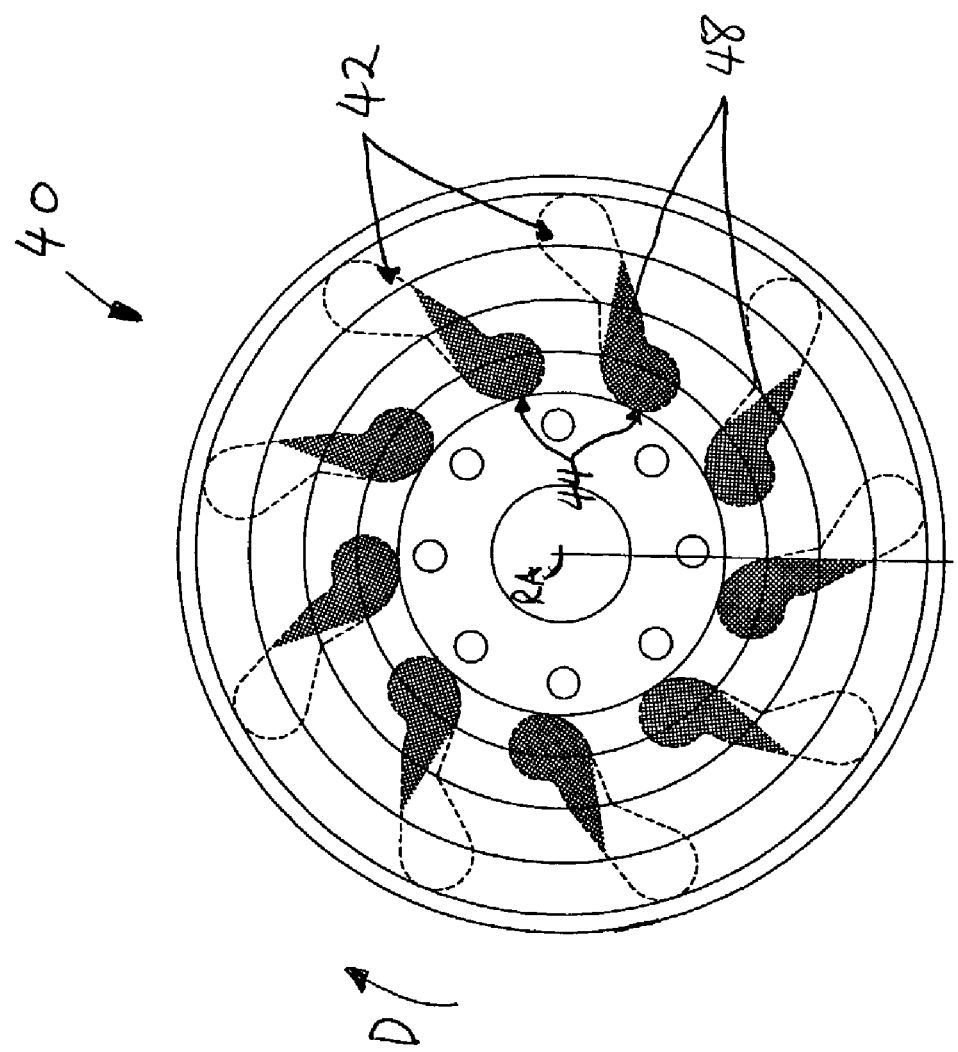

VIBRATION ABSORBER ASSEMBLY

BACKGROUND OF THE INVENTION

1. Field of the Invention

This invention relates to an improved vibration absorber for internal combustion engines. More specifically, this invention is directed to an improved vibration absorber assembly for absorbing torsional vibration and altering the moment of inertia of the vibration absorber assembly.

2. Description of Related Art

Internal combustion engines utilize one or more cylinders that operate in a combustion cycle and fire sequentially in order to provide torque to a crankshaft or other output shaft thereby causing rotation thereof to provide power. This power is then used by cars, trucks, boats, generators, pumps, etc.

The power delivered to the crankshaft or output shaft is inconsistent and varies at most of the individual 360 degree points that comprise a single revolution in terms of its components, including torque magnitude and rotation speed. It is not unusual for the torque to deviate from nominal torque by over 100%, and the rotation speed to deviate from nominal by over 15%. These peaks and valleys in torque output result in excessive wear to bearings, gears, clutch plates, universal joints, breakage of component parts such as camshafts, crankshafts, etc., as well as a reduction in power output, and increased fuel consumption.

A typical engine's cyclic power output may be analyzed to further describe the above. An example engine mass produced by a well regarded manufacturer is a 6 cylinder, 4 cycle diesel engine that produces 400 pound foot (hereinafter "lb-ft") of torque and 50 horsepower (hereinafter Hp) at 800 revolutions per minute (hereinafter "RPM"). The same engine produces 560 lb-ft of torque and 150 Hp at 1400 RPM, and 400 lb-ft of torque and 200 Hp at 2400 RPM.

During each revolution of this engine, three cylinders fire and produce varying amounts of torque upon the crankshaft during their power strokes which occur during 180° of crankshaft rotation. These and all other cylinder firings are timed to occur at 120° increments of the crankshaft's rotation and the power strokes are continuously repeated during the engines operation. Concurrent with these sequenced cylinder firings, various other actions occur such as compression strokes of other cylinders as well as inertial forces of pistons, connecting rods or other components that release energy to or extract energy from the crankshaft. These forces can cause the torque to deviate from nominal torque by over 100%, and the rotation speed to deviate from nominal by over 15% as previously noted, thus yielding characteristics that would obviate the viability of the engine for modern day use.

The addition of a flywheel and/or vibration damper to receive, store, and release some of these torque and power excesses to the crankshaft at a later time in the cycle improves the engine's operating characteristics to a more acceptable 70% deviation from the nominal torque, thus making internal combustion engines commercially viable. The above example engine utilizes a 10.8 inch diameter vibration damper weighing 53 pounds, 22 pounds of which lies in an outer perimeter ring.

In the above regard, engine manufacturers have long incorporated added components such as flywheels, vibration dampers, balance shafts, dampened clutch plates, etc. to improve engine performance by minimizing the negative effects caused by variable torque and rotational speed of the engine. These added components have achieved significant improvement in engine operation via actions and processes outlined hereinafter.

Flywheels have long been used by engine manufacturers to receive and store energy from the crankshaft or other output shaft when the shaft is accelerating, and give back energy to the shaft when it is decelerating. Typically, flywheels are disk shaped with a large proportion of their mass being provided along the rim at a fixed radius from the disk center where the flywheel is generally mounted on the shaft. The quantity of energy stored or released by the flywheel is generally proportional to the rotating shaft's speed change since the location of the mass is fixed.

A vibration damper is like the flywheel in most aspects, yet different insofar as most of its mass is not fixed to a rotating disk, but instead is merely encapsulated, and/or flexibly attached. Because the mass is not fixed, a damper exhibits a dampening or shock absorbing effect upon the torsional vibration of the output shaft, while wasting some of the excess horsepower as heat. In addition, because of the mass of the vibration damper, the vibration damper also acts like a flywheel except that a time delay in response occurs since the mass is not fixed. This device is generally attached to the front of the crankshaft whereas the dampened flywheel is generally attached at the rear of the crankshaft and relies upon a dampening clutch plate, etc., to follow and protect downstream components.

The combined effect of a flywheel and the flywheel effect of the vibration damper have produced significant improvement in engine torque and rotational speed from a nominal but still allow the engine to deviate 70% from nominal in torque output, and 10% from nominal rotational speed. These high deviations from nominal values reduce fuel efficiency and cause component parts excessive wear and failure. Thus, related component parts have to be made stronger to withstand these torque peaks which generally increases cost and weight of the component parts.

Additional inertial mass could be added to further reduce the aforesaid torque deviations. However, this would bring additional negative effects such as engine sluggishness, slow throttle response, accentuated whip-lash action during acceleration reversals, etc. Consequentially, significant addition of inertial mass to vibration dampeners, or other components of the engine have been abandoned as a means to further reduce torque deviations.

U.S. Pat. No. 2,346,972 to Kishline discloses a vibration dampener having a means for dampening torsional vibrations in the crankshaft of an internal combustion engine. In this regard, Kishline discloses that the vibration dampener includes a means for mounting an inertia member on a crank shaft at a point eccentrically disposed with respect to the axis of rotation of the crankshaft. The inertia member is relatively free to move both radially and rotatively with respect to the crank shaft, and to receive energy from, and impart energy to, the crankshaft to produce a dampening effect.

Similarly, U.S. Pat. No. 5,295,411 to Speckhart discloses a system for absorbing torsional vibration in a shaft rotated about an axis that is exposed to torsional disturbances which cyclically increase and decrease the rotational speed of the shaft. In particular, Speckhart discloses a body attachable to the shaft including cylindrical rolling elements positioned within cavities disposed in the body. During operation, the torsional disturbances induce pendulum-like motion of the cylindrical elements within the cavities that absorbs torsional vibration of the shaft. Speckhard further discloses that the cylindrical elements, the cavities, and the torsional disturbances, are related to one another in accordance with an equation which optimizes performance of the system and circumvents time-consuming trial and error techniques during design of the system.

Despite introducing improved systems for absorbing torque deviations, the systems disclosed in Kishline and Speckhart have not gained acceptance in the automotive industry or other applicable industries. Therefore, there still exists an unfulfilled need for a device or method for reducing variation in engine torque and rotational speed. In particular, there still exists a need for such a device and method that more efficiently absorbs torsional vibration and/or alters moment of inertia and flywheel effect of the device. There also further exists an unfulfilled need for such a device or method that increases power output and fuel efficiency of the engine.

SUMMARY OF THE INVENTION

In view of the above, one advantage of the present invention is in providing a vibration absorber and method that reduces variation in engine torque and rotational speed while increasing the nominal torque output.

Another advantage of the present invention is in providing a vibration absorber and method that more efficiently absorbs torsional vibration and/or alters moment of inertia of the device.

Still another advantage of the present invention is in providing a vibration absorber and method that improves the output and efficiency of the engine.

Yet another advantage of the present invention is in reducing the weight of the flywheel and/or vibration dampener and drive train parts in comparison to such components providing similar performance.

In accordance with one embodiment of the present invention, vibration absorber assembly is provided, the vibration absorber including a disc shaped housing having a central rotational axis and a plurality of radially elongated cavities, and a plurality of movable masses, each movable mass being housed in, and movable within, one of the plurality of radially elongated cavities. In this regard, the plurality of movable masses are preferably movable in the plurality of radially elongated cavities to absorb torsional vibration, and/or alter moment of inertia of the vibration absorber assembly, thereby altering its flywheel effect.

In accordance with another embodiment of the present invention, each of the plurality of radially elongated cavities include a first end and a second end. The first end and the second end may be positioned at the same radial distance from the central rotational axis. Alternatively, the first end may be positioned at a first radial distance from the central rotational axis and the second end is positioned at a second radial distance from the central rotational axis. In this regard, the first radial distance may be less than the second radial distance so that the first end is radially closer to the central rotational axis than the second end.

In accordance with another embodiment, the vibration absorber assembly may be adapted to be rotated in a predetermined direction. In such an embodiment, the first end may lead the second end of each of the plurality of radially elongated cavities when the vibration absorber assembly is rotated in the predetermined direction.

The movable mass may be implemented in various different ways. In this regard, in one embodiment, the movable mass may be circular rod shaped and may be made of a metal. In another embodiment, the movable mass may be a volume of liquid. For example, the liquid may be mercury. Moreover, the vibration absorber assembly may be provided with a cover plate attached to the housing to retain the plurality of movable masses in the plurality of radially elongated cavities.

In accordance with another embodiment of the present invention, a vibration absorber assembly is provided, the assembly including a disc shaped housing having a central rotational axis and a plurality of cavities, each cavity having an interior volume, and a volume of liquid housed in each of the cavities, the volume of liquid being less than the interior volume so that the volume of liquid is movable within the interior volume. Preferably, the volume of liquid is movable in each of the plurality of cavities to thereby absorb torsional vibration and/or alter moment of inertia of the vibration absorber assembly.

In accordance with still another embodiment of the present invention, each of the plurality of cavities of the vibration absorber assembly may be circular in shape. Alternatively, each of the plurality of cavities may be elongated in shape and have a first end positioned at a first radial distance from the central rotational axis and a second end positioned at a second radial distance from the central rotational axis. In such an embodiment, the first radial distance may be less than the second radial distance so that the first end is radially closer to the central rotational axis than the second end.

In accordance with various embodiments, the plurality of radially elongated cavities may have a kidney bean shape, C-shape, or fan shape. In another embodiment, each of the plurality of radially elongated cavities are formed with a plurality of radii in a manner that the plurality of movable masses move within the plurality of radii with varying velocity in response to at least one of acceleration and deceleration of the vibration absorber assembly.

In accordance with one implementation, the volume of liquid may be mercury. In this regard, the vibration absorber assembly may further be provided with a cover plate attached to the housing to retain the volume of liquid in each of the plurality of cavities.

These and other features and advantages of the present invention will become more apparent from the following detailed description of the preferred embodiments of the present invention when viewed in conjunction with the accompanying drawings.

BRIEF DESCRIPTION OF THE DRAWINGS

FIG. 6A shows a disc shaped housing for a vibration absorber assembly in accordance with yet another embodiment of the present invention.

FIG. 6B is a cross-sectional view of the housing of FIG. 6A as viewed along 6B—6B.

FIG. 6D shows the housing of FIG. 6A but with the volume of liquid being at a radially inward position in response to deceleration of the vibration absorber assembly.

DETAILED DESCRIPTION OF THE PREFERRED EMBODIMENT

Figure 1A:
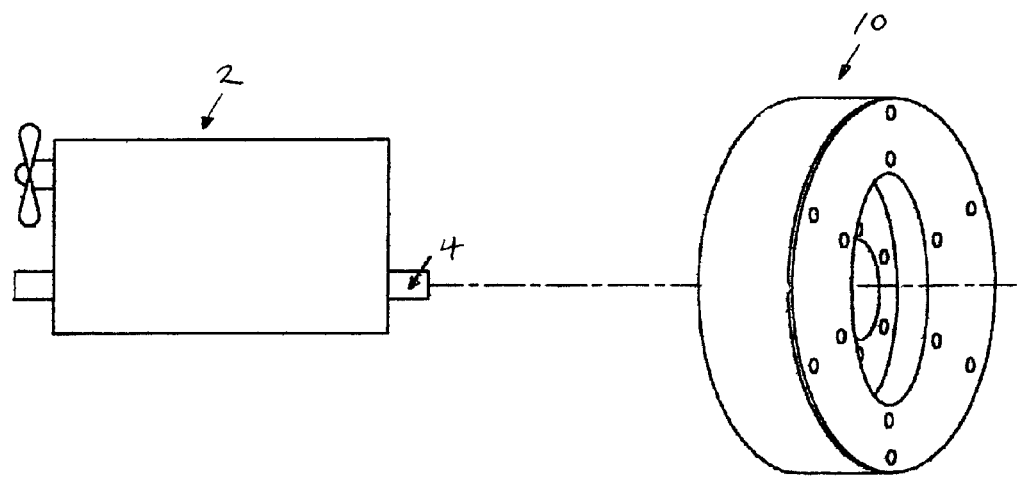
FIG. 1 is a schematic illustration of a vibration absorber assembly in accordance with one embodiment of the present invention which is used in an internal combustion engine.

FIG. 1A shows a vibration absorber assembly 10 in accordance with one embodiment of the present invention which is used as a flywheel to absorb torsional vibration generated by various devices such as an internal combustion engine 2. In this regard, the vibration absorber assembly 10 may be designed for attachment to the output shaft 4 of the internal combustion engine 2 for use as the flywheel. Of course, the vibration absorber assembly 10 is not drawn to scale in FIG. 1A. Alternatively, as shown in FIG. 1B, the vibration absorber assembly 10 may be designed for attachment to the front 5 of the crank shaft of the internal combustion engine 2, and be used as a vibration dampener which is also commonly referred to as a harmonic balancer.

Figure 1B:
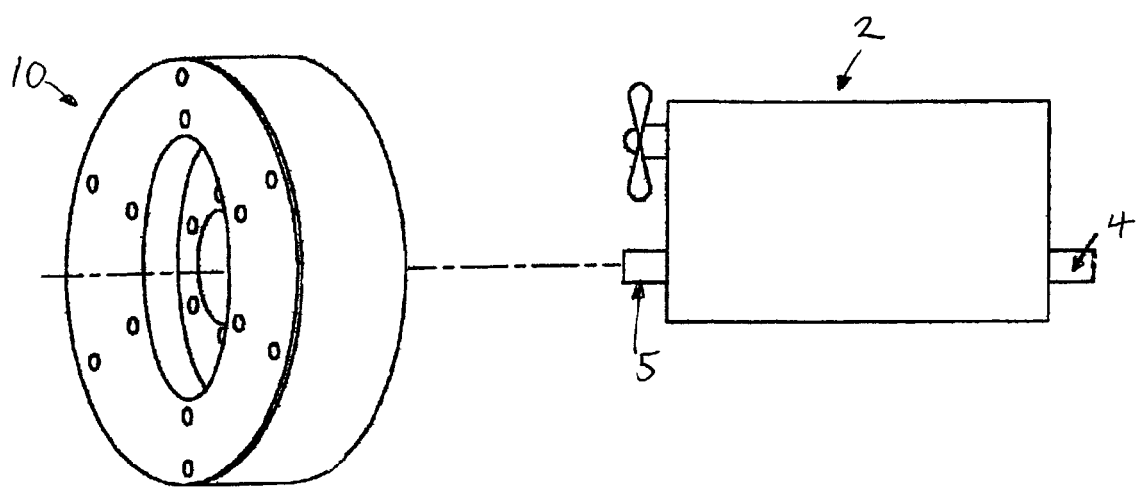

Again, FIG. 1B is not to scale. Of course, the vibration absorber assembly 10 may be appropriately modified for intended use, whether it be used as a flywheel or a vibration dampener.

Regardless of where the vibration absorber assembly 10 is attached, it will be evident from the discussion herein below that the vibration absorber assembly 10 reduces variation in torque and rotational speed of the output shaft, which in the present embodiment, may be a crank shaft of the internal combustion engine 2. It will also be evident that the vibration absorber assembly 10 more efficiently absorbs torsional vibration than the prior art flywheels or vibration dampeners discussed previously. In addition, it will also be evident how various embodiments of the present invention enhance power output and efficiency of the internal combustion engine 2 by altering the moment of inertia of the vibration absorber assembly 10 in response to torque and speed variations of the crank shaft.

Of course, it should be noted that the vibration absorber assembly of the present invention need not be applied to internal combustion engines only. In this regard, the present invention may readily be applied to other devices in which torsional vibration occurs during operation. Moreover, the vibration absorber assembly as described herein need not be applied as a flywheel or a vibration dampener, but may instead be implemented as a different component of the device to which the present invention is applied. For instance, the present invention may be implemented in a pulley or incorporated into the counterweights of the crank shaft in a manner similar to that as disclosed in U.S. Pat. No. 5,295,411 to Speckhart. Of course, the vibration absorber assembly of the present invention may be implemented in other applications as well. However, its implementation to an internal combustion engine is referred to herein below due to the ubiquitous nature of the internal combustion engines and the substantial benefits derived by the present invention in such applications.

Figure 2:
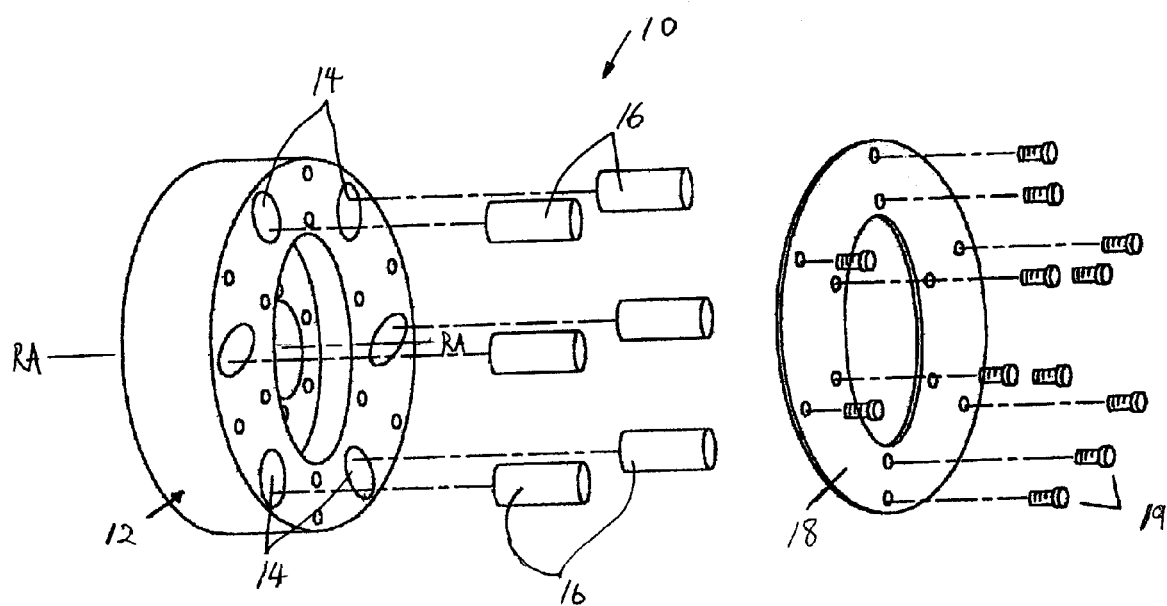
FIG. 2 is an exploded view of a vibration absorber assembly in accordance with one embodiment of the present invention.

FIG. 2 shows an exploded view of a vibration absorber assembly 10 in accordance with one embodiment in the present invention that may be used in the manner discussed above. The vibration absorber assembly 10 includes a disc shaped housing 12 having a central rotational axis RA about which it rotates. The disc shaped housing 12 also includes a plurality of radially elongated cavities 14, the details of which are discussed below relative to FIGS. 3A and 3B. The vibration absorber assembly 10 also includes a plurality of movable masses 16 that are housed in the plurality of radially elongated cavities 14. In the present embodiment, the vibration absorber assembly 10 also includes a cover plate 18 that is adapted to be attached to the disc shaped housing 12 via a plurality of fasteners 19. The cover plate 18 is attached to the housing 12 to retain the plurality of movable masses 16 in the radially elongated cavities 14, and in other embodiments, may be attached to the disc shaped housing 12 in any appropriate manner such as by welding. As described in further detail below, the plurality of movable masses 16 are movable within the radially elongated cavities 14 of the housing 12 so as to absorb torsional vibration and/or to alter the moment of inertia of the vibration absorber assembly 10.

It should also be noted that, whereas in the illustrated embodiment of FIG. 2, a cover plate 18 is provided which retains the plurality of movable masses 16 in the elongated cavities 14, in other embodiments of the present invention, other mechanisms may be used to perform this function. For example, each individual radially elongated cavity may be provided with a corresponding cap which retains a movable mass therein. Alternatively, a retaining plate may be provided to retain two or more movable masses in their corresponding radially elongated cavities 14. Of course, further variation and adaptation of the cover plate 18 may be used in other embodiments as well.

As shown and illustrated in the embodiment of FIG. 2, the movable masses 16 of the vibration absorber assembly 10 may be implemented as circular rods that are oriented substantially parallel to the central rotational axis RA. In this regard, the movable masses 16 may be made of solid materials, e.g. metal, and sized to be received in the radially elongated cavities 14. The circular cross-sectional shape of the movable masses 16 facilitate movement of the movable masses 16 in the radially elongated cavities 14 in response to acceleration and/or deceleration of the vibration absorber assembly 10 caused by the torsional vibration of the crank shaft. Of course, in other embodiments of the present invention, the movable masses may be shaped differently and further be made of any appropriate materials.

Figure 3A:
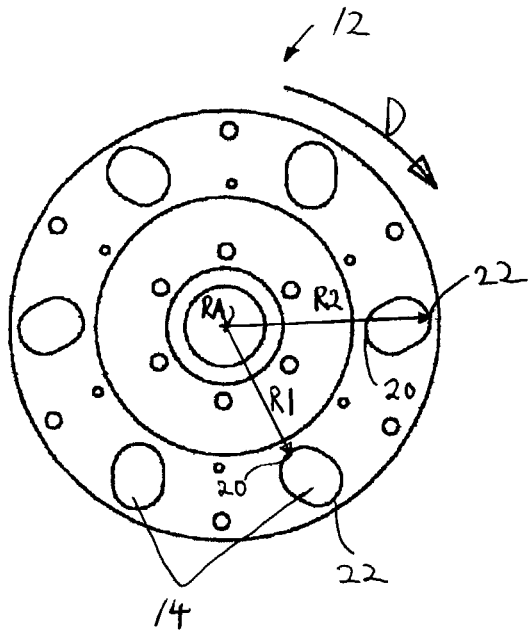
FIG. 3A is a frontal view of the disc shaped housing of the vibration absorber assembly of FIG. 2.
Figure 3B:
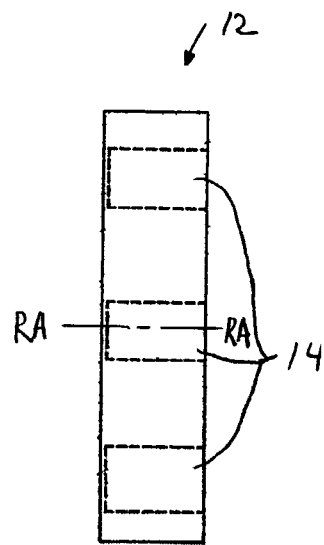
FIG. 3B is a side profile view of the housing of FIG. 3A which more clearly shows the plurality of radially elongated cavities.

FIG. 3A shows a front view of the disc shaped housing 12 discussed above relative to FIG. 2. In accordance with the illustrated embodiment, the plurality of radially elongated cavities 14 in the present embodiment are shaped to alter the moment of inertia of the vibration absorber assembly in response to acceleration and/or deceleration forces caused by the torsional vibration. In particular, the cavities 14 are radially elongated as shown in FIG. 3A. In this regard, the term "radially elongated" as used herein refers to the fact that the cavities 14 have an elongated shape when the disc shaped housing 12 is viewed from the front as shown in FIG. 3A. This should be distinguished from the axially elongated shape of the cavities as well which is most clearly illustrated in FIG. 3B that shows the side view of the disc shaped housing 12. As shown in FIG. 3B, each of the plurality of elongated cavities extend axially in the housing 12 so that the cavities 14 extend substantially parallel to the rotational axis RA. The cavities 14 are also radially elongated in the sense that the elongation of the cavity is in the plane perpendicular to the rotational axis RA, this feature again being most clearly shown in FIG. 3A.

In the illustrated embodiment of FIG. 3A, the disc shaped housing 12 is adapted to be rotated in the direction of arrow "D". In this regard, each of the plurality of radially elongated cavities 14 include a first end 20 that is positioned at a first radial distance R1 from the central rotational axis RA, and a second end 22 that is positioned at a second radial distance R2 from the central rotational axis RA. It should be evident in the illustrated embodiment of FIG. 3A that the first radial distance R1 is less than the second radial distance R2 so that, in effect, the first end 20 is positioned radially closer to the central rotational axis RA than the second end 22. Thus, when the disc shaped housing 12 is rotated in the direction of arrow D, the first end 20 leads the second end 22 in the present embodiment.

It should be noted that in other embodiments of the present invention, the first end and the second end of the plurality of radially elongated cavities may be positioned at a same radial distance from the central rotational axis. Such an embodiment may be used to absorb torsional vibration. However, it would not be as effective in altering the moment of inertia of the vibration absorber assembly in the manner described in further detail below. Consequently, the embodiment as shown in FIG. 3A in which the radial distance of the first end and the second end are different is more preferred for the example engine.

Figure 4:
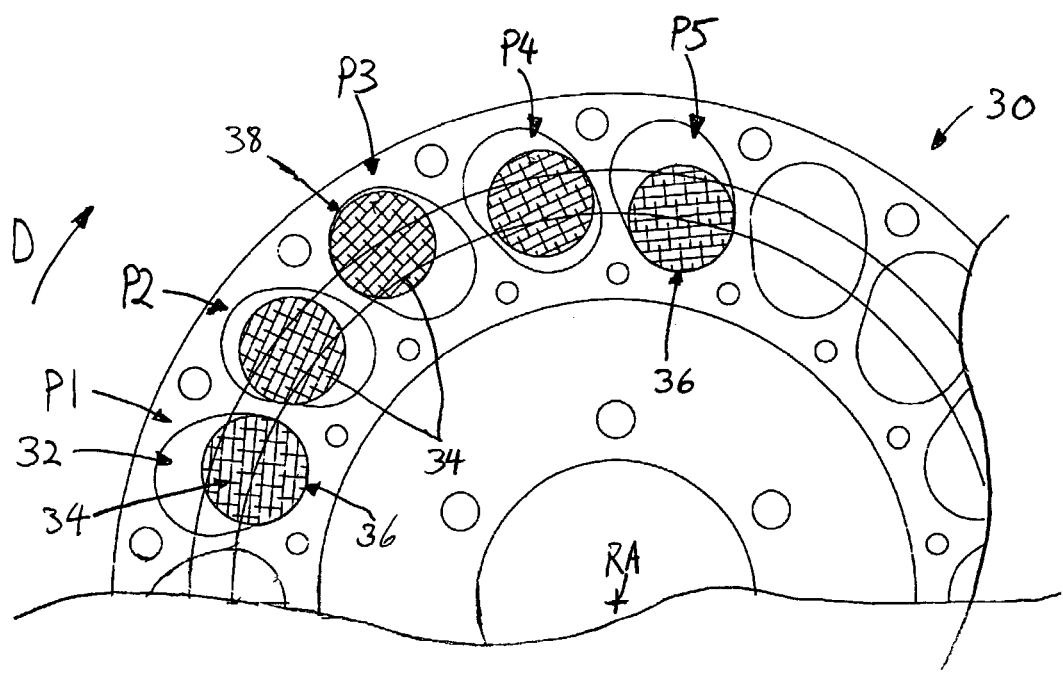
FIG. 4 is an operational illustration of movable masses in various positions within the radially elongated cavities of a housing of a vibration absorber assembly in accordance with another embodiment of the present invention.

FIG. 4 shows a disc shaped housing 30 in accordance with another embodiment of the vibration absorber assembly of the present invention. It should be noted that the disc shaped housing 30 of FIG. 4 differs from the disc shaped housing 12 of FIG. 3A primarily in that it is provided with a greater number of radially elongated cavities 32. In addition, the disc shaped housing 30 of FIG. 4 is illustrated with five of the radially elongated cavities 32 having movable masses 34 received therein which are illustrated in various positions to facilitate describing the operation of the vibration absorber assembly which is adapted to alter the moment of inertia thereof in accordance with one embodiment of the present invention. In this regard, it should be understood based on the discussion below that FIG. 4 does not illustrate the operation of the vibration absorber assembly at any instant in time, but rather, illustrates the movement of the movable masses 34 within the radially elongated cavities 32 during the course of cyclic operation of the components of the vibration absorber assembly in response to torsional vibration.

In particular, FIG. 4 shows a disc shaped housing 30 that is adapted to be rotated in the direction of arrow D in which the movable masses 34 move within the radially elongated cavities 32 from position P1 to position P3, back to position P5, and so forth, in response to the acceleration and/or deceleration forces caused by the torsional vibration of the vibration absorber assembly. Again, as described previously, such torsional vibration may be attributed to the operation of the device to which the present invention is applied, for example, an internal combustion engine shown in FIG. 1.

More specifically, in position P1, the movable mass is in a radially inward position proximate to the first end 36 of the radially elongated cavity 32. As the vibration absorber assembly of the present invention is accelerated by the torsional vibration of the device to which the present invention is applied, the movable mass 34 moves radially outwardly from the rotational axis RA as shown in position P2. The movable mass 34 reaches its radially outward position P3 in which the movable mass 34 is proximate to the second end 38 of the radially elongated cavity 32.

As the disc shaped housing 30 is subjected to deceleration forces which is caused by the torsional vibration upon the vibration absorber assembly, the movable mass 34 is moved radially inwardly, closer to the rotational axis RA as shown in position P4. The deceleration forces caused by the torsional vibration causes the movable mass 34 to again assume its radially inward position as shown in position P5 in which the movable mass 34 is proximate to the first end 36 of the radially elongated cavity 32. Because the torsional vibration applied to the vibration absorber assembly of the present invention is typically cyclical, the above described movement of the movable mass 34 is cyclically repeated so that the movable mass 34 is moved between its radially inward position and its radially outward position within the radially elongated cavity 32.

This radially inward and radially outward movement of the plurality of movable masses 34 allows the moment of inertia and power storage capacity of the vibration absorber assembly of the present invention to be altered, thereby providing a variable flywheel effect. In particular, the movement of the movable masses 34 allows the vibration absorber assembly in accordance with the present invention to absorb or otherwise receive energy during acceleration thereof, and to release energy during deceleration of the vibration absorber assembly.

In the above regard, the vibration absorber assembly effectively increases efficiency of the device to which the present invention is applied by storing energy released at undesirable time or location during operation of the internal combustion engine, and releasing this stored energy at desired time or location. Thus, it should be appreciated that as used herein, the term "absorb" and derivatives thereof such as "vibration absorber assembly" does not refer to mere dissipation of torsional vibration, but storage and release of energy provided by such vibration.

Referring back to FIG. 2, it should be appreciated that the plurality of movable masses 16 that are retained in the radially elongated cavities 14 of the disc shaped housing 12 are moved therein simultaneously in a similar manner in response to the acceleration and/or deceleration of the vibration absorber assembly 10 which may be caused by, for example, torsional vibration of internal combustion engine 2 of FIG. 1. Moreover, the shape of the radially elongated cavities 14 in which the first end 20 is positioned at a radial distance less than the second end from the central rotational axis CR, allows the movable masses 16 to be moved between a radially inward position and a radially outward position as described above in response to acceleration and/or deceleration forces caused by the torsional changes, i.e. vibration.

This radial movement of the moveable masses 16 within the radially elongated cavities 14 allows more efficient absorption of torsional vibration by the vibration absorber assembly 10 of the present invention. Of course, as previously noted, other embodiments of the present invention may be provided with radially elongated cavities in which the radial distances of the first end and the second end are the same. However, as described herein below, such an embodiment would not alter the moment of inertia of the vibration absorber assembly which can be used to effectively reduce the crank shaft's variation in engine torque and rotational speed as well as increase output and efficiency of an internal combustion engine to which the present invention may be applied.

Figure 5A:
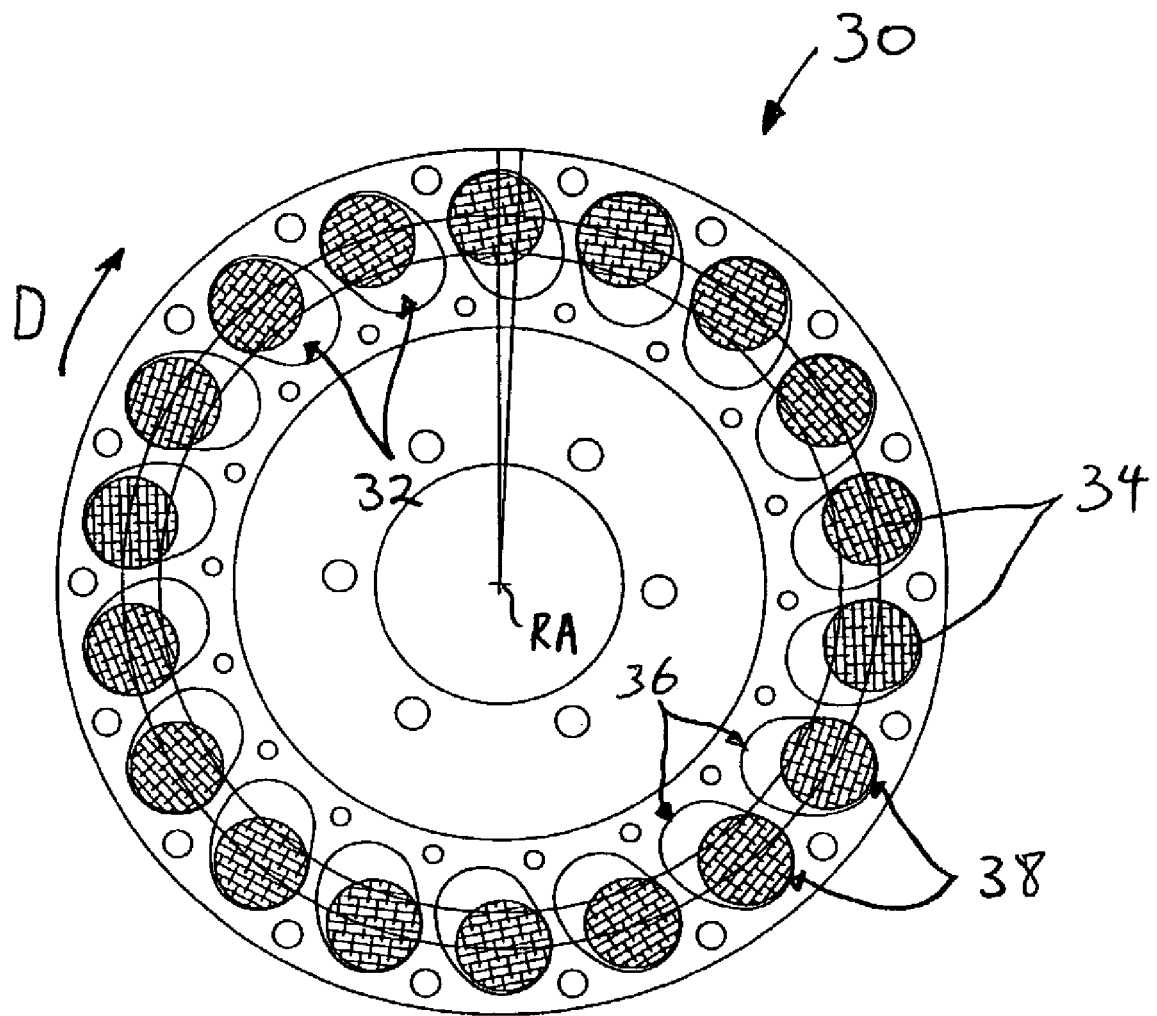
FIG. 5A shows a disc shaped housing for a vibration absorber assembly in accordance with yet another embodiment of the present invention where the plurality of movable masses are in a radially outwardly position in response to acceleration forces.

FIG. 5A shows a frontal view of the disc shaped housing 30 discussed above relative to FIG. 4 that may be used for a vibration absorber assembly in accordance with one embodiment of the present invention. In this regard, as shown in FIG. 5A, a plurality of movable masses 34 are retained in radially elongated cavities 32. The disc shaped housing 30 is adapted to be rotated in direction "D" about rotational axis RA as previously described. The torsional vibration of the vibration absorber assembly to which the disc shaped housing 30 is applied, causes acceleration and deceleration of the movable masses 34. FIG. 5A illustrates the position of the movable masses 34 when the disc shaped housing 30 is subject to acceleration forces. As shown, the plurality of movable masses 34 are moved to their radially outward position in which the plurality of movable masses 34 are adjacent to the second ends 38 of the plurality of radially elongated cavities 32.

Figure 5B:
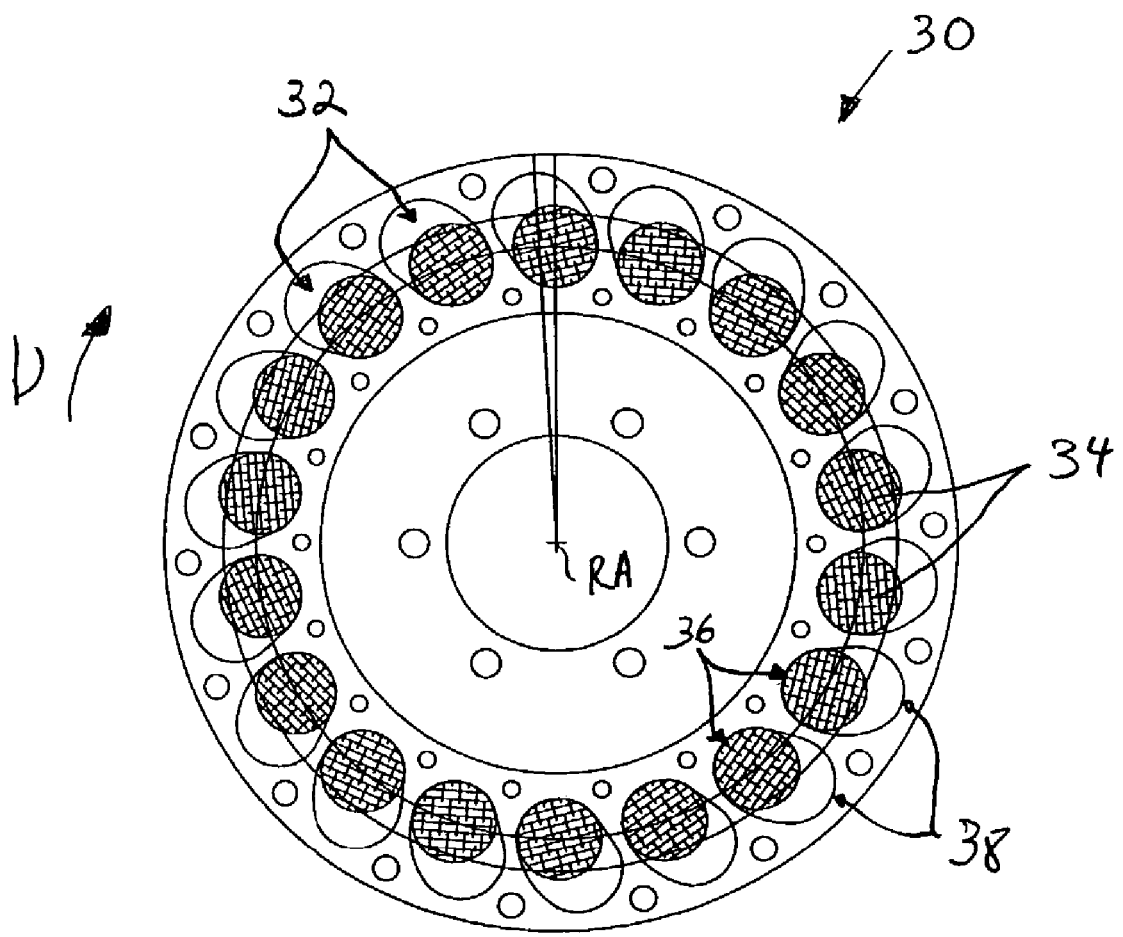
FIG. 5B shows the plurality of movable masses of FIG. 5A in a radially inward position in response to deceleration forces.

FIG. 5B shows the disc shaped housing 30 of FIG. 5A with the plurality of movable masses 34 retained in the plurality of radially elongated cavities 32 when the vibration absorber assembly to which the disc shaped housing 30 is applied is under deceleration, such deceleration being caused by torsional vibration, for example. As shown, the plurality of movable masses 34 are in their radially inward position in which they are adjacent to the first end 36 of the plurality of radially elongated cavities 32.

As previously noted with respect to FIG. 4, the plurality of movable masses, 34 move within the radially elongated cavities 32 between the radially outward position as shown in FIG. 5A, to the radially inward position as shown in FIG. 5B. As also previously noted, such movement allows the vibration absorber assembly in accordance with the present invention to more efficiently absorb torsional vibration as well as alter the flywheel effect.

In addition, it should be readily apparent by comparing the disc shaped housing 30 of FIGS. 5A and 5B that the moment of inertia of the disc shaped housing 30 is altered by the movement of the movable masses 34 in the radially elongated cavities 32. In particular, it should be evident to one of ordinary skill in the art that the moment of inertia and power stored in the disc shaped housing 30 in FIG. 5A is significantly greater than the moment of inertia and power stored in the disc shaped housing 30 as shown in FIG. 5B. This alteration of the moment of inertia for the disc shaped housing 30 is attributable to the position of the plurality of movable masses 34 in the radially elongated cavities 32, the radially outward positioning of the plurality of movable masses 34 distributing the mass of the disc shaped housing 30 further away from the rotational axis RA than when the plurality of movable masses 34 are in their radially inward positions.

Figure 5C:
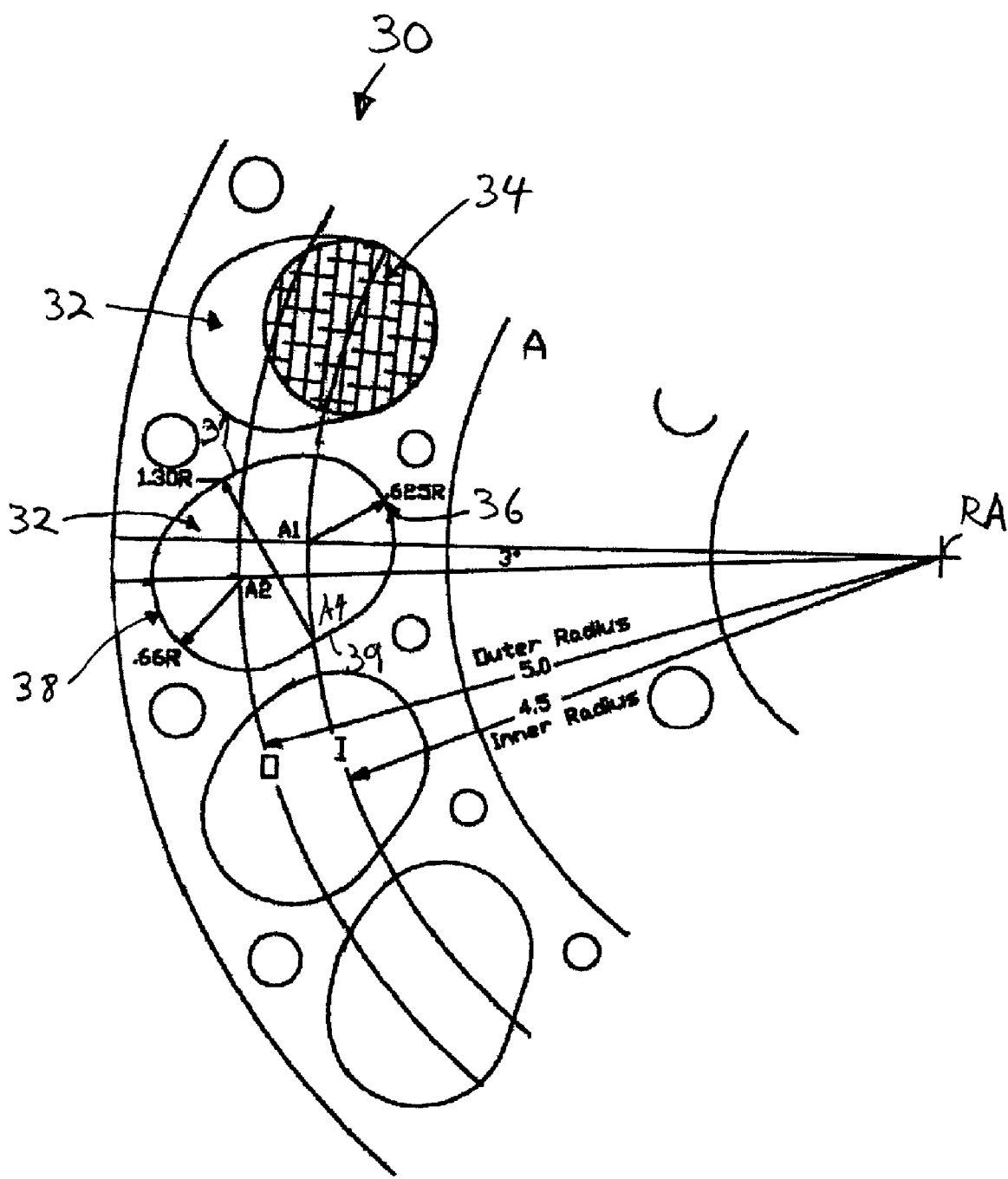
FIG. 5C shows an enlarged view of the radially elongated cavities for the disc shaped housing of FIG. 5A in accordance with one embodiment.

Referring again to the embodiment as described above relative to FIGS. 4 to 5B, the plurality of radially elongated cavities 32 are uniquely shaped to facilitate movement of the plurality of movable masses 34 received therein in response to the torsional vibration. In particular, as shown in the enlarged view of FIG. 5C, the radially elongated cavities 32 of the illustrated embodiment are comprised of two half circles spaced apart both radially and circumferentially, and are connected at their forward and rearward perimeter by preferably arced surfaces so that the radially elongated cavities 32 have a slight kidney bean shape. Of course, in another embodiment, the two half circles may be connected at their forward and rearward perimeter by straight surfaces.

In the above regard, in the illustrated embodiment, the first end 36 of the radially elongated cavities 32 are formed with an inward-most radius from point A1 which is outboard of the inner radius "I", approximately 4.5" from the central rotational axis CR. The first end 36 is slightly larger than the radius of the plurality of movable masses 34 which in the present example, may have a radius of 0.62". The second end 38 of the radially elongated cavities 32 are formed with the outer-most radius of approximately 0.66" from point A2 which is inboard of the outer radius "O", approximately 5.0" from the central rotational axis CR.

In the present example, point A1 is approximately 2 degrees offset from point A2. Moreover, the surfaces connecting the first end 36 to the second end 38 to thereby form the radially elongated cavity 32 are arced in the present example. For instance, the leading surface 37 may be arced at a radius such as 1.3" from point A4 as shown. Alternatively, a plurality of radii may be utilized to further modify dampening and shock absorbing effects.

By providing radially elongated cavities 32 having a slight kidney bean shape, or by providing radially elongated cavities with a plurality of radii, the rate of motion of the movable masses 34 within the radially elongated cavities 32 in response to the torsional vibration, can be made non-linear. In other words, by providing radially elongated cavities 32 having a slight kidney bean shape, or by providing radially elongated cavities with a plurality of radii, the plurality of movable masses move within the plurality of radii with varying velocity in response to acceleration or deceleration of the vibration absorber assembly.

Of course, such arcing of surface 37 is wholly optional and in other embodiments, may be a straight planar surface instead. However, by providing such a radiused surface, the movement of the movable mass 34 within the radially elongated cavity 38 can be optimized to provide more forward motion and less slowing and inward motion of the movable masses 34 at the beginning of deceleration, thus providing a greater dampening/shock reducing effect during this critical time where there is change in acceleration forces.

Stated in another manner, at the rotational point where direction of the acceleration from the torsional vibration changes, it is beneficial to permit the plurality of movable masses 34 to maintain a greater portion of their forward velocity and inertia to lessen shock on the vibration absorber assembly and the internal combustion engine's output shaft while utilizing a smaller portion of the inertial force to turn the movable masses 34 only slightly inward. After this critical point, the radius of 1.3" of the present example, can be gradually increased to thereby absorb a greater portion of the inertial energy of the moveable masses 34 while approaching its minimum velocity at the first end 36 of the radially elongated cavity 32 in a manner and process similar to that of the Pelton Wheel.

Similarly, the trailing surface 39 of the radially elongated cavities 32 may be formed with a convex arced surface to control the travel path and movement characteristics of the movable masses 34 within the radially elongated cavities 32. Such a feature would permit the radially elongated cavities 32 to have a kidney like shape. Of course, the above described shape and dimensions of the radially elongated cavities 32 and the movable masses 34 are merely one exemplary embodiment only and the present invention is not limited by such details in any way. In this regard, depending on the specific application and operating parameters, the shape and dimensions of the radially elongated cavities 32 and/or movable masses 34 may be readily altered to provide optimal performance.

FIG. 6A shows a disc shaped housing 40 of a vibration absorber assembly in accordance with still another embodiment of the present invention that may be used to absorb torsional vibration and/or alter the moment of inertia thereof. As shown, the disc shaped housing 40 is adapted to be rotated in direction "D" about rotational axis RA. The disc shaped housing 40 is provided with a plurality of radially elongated cavities 42. In the illustrated embodiment, the plurality of radially elongated cavities 42 are provided with the first end 44 and second end 46, the first ends 44 being positioned closer to the rotational axis RA than the second ends 46 in a manner similar to the previous embodiments.

FIG. 6B shows a cross-sectional view of the disc shaped housing 40 of FIG. 6A as viewed along the cross-section 6B—6B. As shown, the radially elongated cavities 42 are provided in the disc shaped housing 40 and may be sealed by a cover plate 46 to thereby retain the movable masses within the radially elongated cavities 42.

Figure 6C:
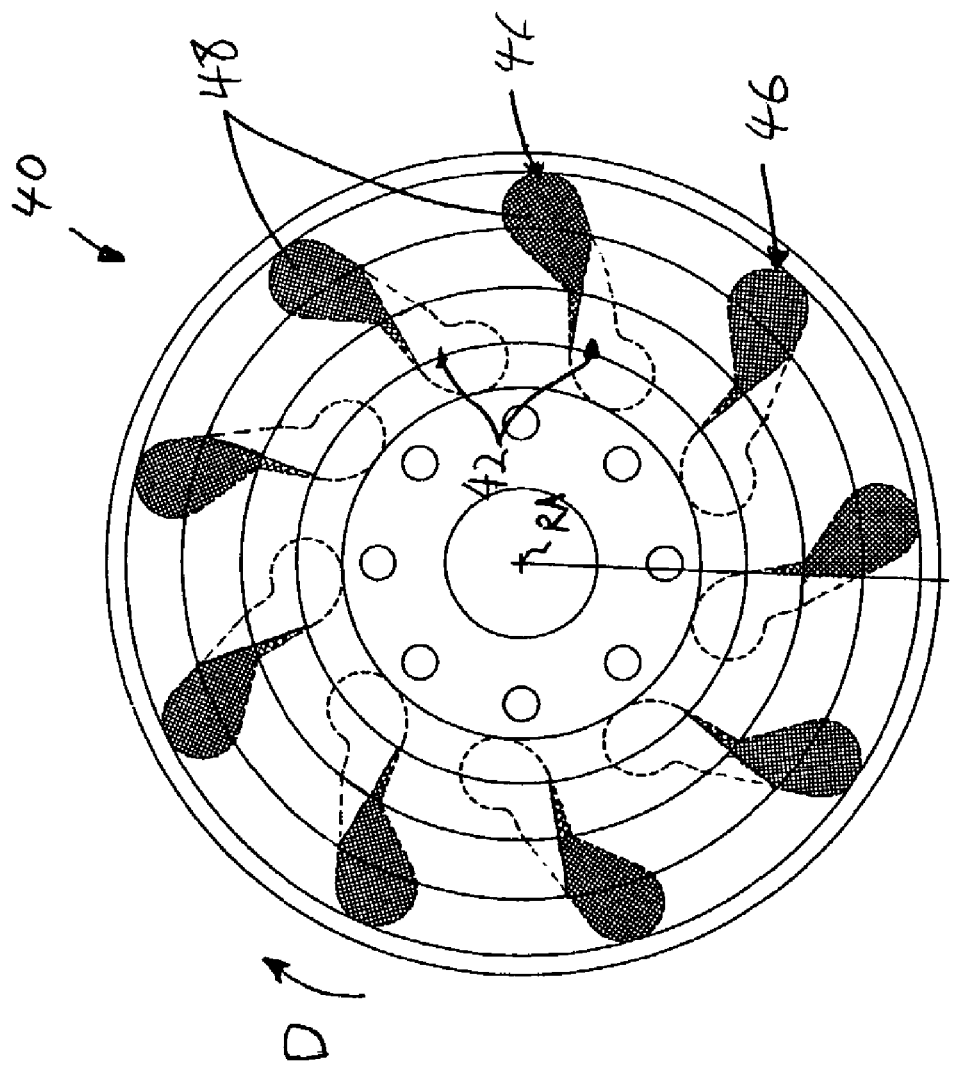
FIG. 6C shows the housing of FIG. 6A with a volume of liquid housed in each of the cavities, the volume of liquid being at a radially outward position in response to acceleration of the vibration absorber assembly.

FIG. 6C shows the disc shaped housing 40 of FIG. 6A with movable masses 48 retained in the radially elongated cavities 42. In the illustrated embodiment, each of the plurality of movable masses 48 are a volume of liquid. In particular, the liquid may be, for example, mercury. Of course, other appropriate liquids may be used for the movable mass 48. As shown in FIG. 6C, each of the plurality of radially elongated cavities 42 have an interior volume for receiving the volume of liquid of the movable masses 48. In this regard, the volume of liquid of the movable masses 48 is less than the interior volume of the plurality of radially elongated cavities 42 so that the movable masses 48 is movably received within the interior volume of the radially elongated cavities 42.

FIG. 6C also shows the disc shaped housing 40 with the movable masses 48 retained in the radially elongated cavities 42 in operation where the disc shaped housing 40 is subjected to acceleration forces, such forces being caused by torsional vibration, for example. In this regard, the volumes of movable masses 48 are at the radially outward position proximate the second end 46 of the radially elongated cavities 42. As shown, because the movable masses 48 are implemented as volumes of liquid in the present embodiment, it can conform to the shape of the interior volume of the radially elongated cavities 42.

FIG. 6D shows the disc shaped housing 40 of FIG. 6C where the volumes of liquids which are the movable masses 48 are subject to deceleration forces of the torsional vibration. In this regard, the movable masses 48 are in their radially inward positions proximate to the first ends 44 of the radially elongated cavities 42. Again, because the movable masses 48 are implemented as volumes of liquid, the movable masses 48 conform to the shape of the interior volume of the radially elongated cavities 42 in the manner shown.

In a manner described previously, the movement of the movable masses 48 within the radially elongated cavities 42 efficiently absorbs torsional vibration. Moreover, by comparing the disc shaped housing 40 of FIGS. 6C and 6D, it can be appreciated how the illustrated embodiment alters the moment of inertia of the vibration absorber assembly to which the disc shaped housing is applied. In particular, because the movable masses 48 are positioned further from the rotational axis RA, the disc shaped housing 40 as shown in FIG. 6C would have a higher moment of inertia than the disc shaped housing 40 of FIG. 6D. Of course, it should be noted that the change in the moment of inertia of the disc shaped housing 40 is attained by providing radially elongated cavities 42 in which the first end 44 is at a radial distance that is different than the radial distance of the second end 46. However, in other embodiments, the radial distances of the first end 44 and the second end 46 may be the same but such an embodiment would not alter the moment of inertia of the disc shaped housing 40.

Figure 7C:
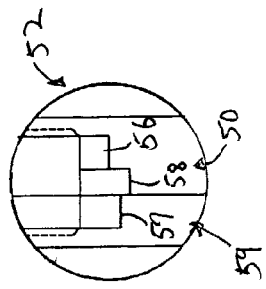
FIG. 7C shows a partial cross-sectional view of the housing and a radially elongated cavity of FIG. 7B as viewed along 7C—7C.
Figure 7B:
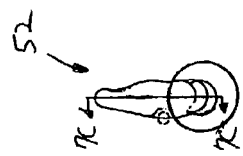
FIG. 7B shows a view of one of the radially elongated cavities.
Figure 7A:
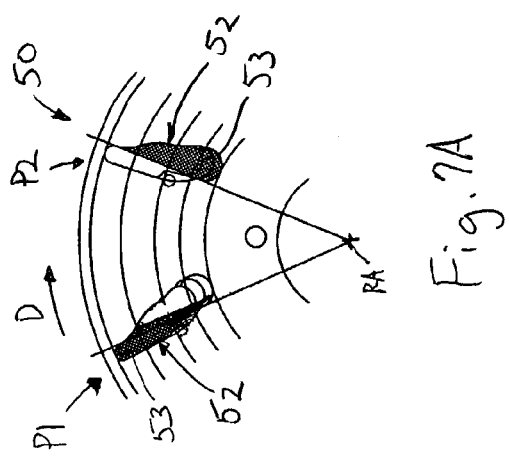
FIG. 7A shows a segment of a disc shaped housing for a vibration absorber assembly in accordance with yet another embodiment of the present invention.

It should be apparent from the above that when the plurality of movable masses for the vibration absorber assembly in accordance with the present invention is implemented as a volume of liquid, the plurality of radially elongated cavities may be shaped in a different manner than that as shown in FIGS. 6A to 6D discussed above. In this regard, FIG. 7A to 7C show one alternative geometry for the radially elongated cavities in which the plurality of movable masses are implemented as a volume of liquid, for example, mercury. It should also be noted that FIG. 7A is provided to illustrate the positions of the movable masses 53 within the radially elongated cavities 52 in response to both acceleration and deceleration forces. Consequently, FIG. 7A does not represent the disc shaped housing 50 in operation at any instant in time.

FIG. 7A shows a segment of disc shaped housing 50 that is adapted to be rotated in direction "D" about the rotational axis RA. As is evident from an examination of FIG. 7A, only a small segment of the disc-shaped housing 50 is shown for clarity purposes. As in the embodiment of FIGS. 6A to 6D, the disc shaped housing 50 is provided with a plurality of radially elongated cavities 52, only two of which are shown in FIG. 7A. In this regard, the plurality of movable masses 53 which are implemented as a volume of liquid are retained in the plurality of radially elongated cavities 52.

In addition, as can be seen, the volume of the movable masses 53 is less than the interior volume of the plurality of radially elongated cavities 52, thereby allowing the movable masses 53 to be moved therein. In particular, the movable masses 53 are in the radially outward position P1 in response to the acceleration forces caused by the torsional vibration. Due to the deceleration forces also caused by the torsional vibration, the movable masses 53 are moved to the radially inward position P2 shown. Thus, the movable masses 53 are movable within the radially elongated cavities 52 between the radially outward position P1 and radially inward position P2 thereby absorbing the torsional vibration and/or altering the moment of inertia of the disc shaped housing 50 in the manner similar to that described previously.

FIG. 7B shows one of the radially elongated cavities 52 while the FIG. 7C shows an enlarged cross-sectional view as viewed along 7C—7C. As shown, in the present embodiment, each of the plurality of radially elongated cavities are provided with varying depth geometry where the dimension of the radially elongated cavities varies axially along the rotational axis RA. Thus, land 56 provides a shallow volume, land 57 provides an intermediate volume, and land 58 provides a deep volume. Moreover, in the present embodiment, the land 57 may be integrated into the cover plate 57 which is secured to the disc shaped housing 50. Of course, this is merely one example of how the plurality of radially elongated cavities can be implemented, and in other embodiments, different geometries may be used.

Figure 8:
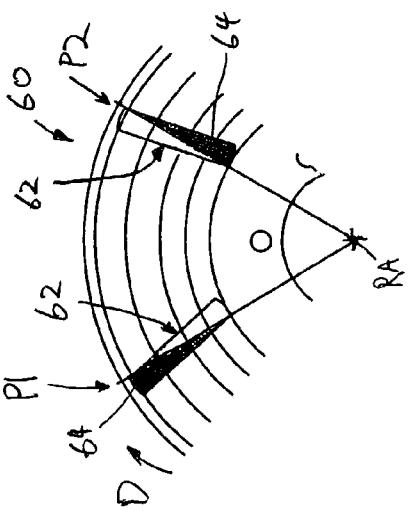
FIG. 8 shows a segment of a disc shaped housing of a vibration absorber assembly in accordance with yet another embodiment of the present invention with a volume of liquid in both radially outward and radially inward positions.

FIG. 8 shows yet another embodiment of the disc shaped housing 60 which may be implemented in a vibration absorber assembly in accordance with the present invention. FIG. 8 merely shows a segment of the disc shaped housing 60 for clarity purposes, the disc shaped housing including a plurality of radially elongated cavities 62 with a plurality of movable masses 64 retained therein. FIG. 8 also illustrates the movable masses 64 in two different positions. In the present embodiment, the movable masses 64 are implemented as a volume of liquid, for example mercury, which has a volume less than the interior volume of the radially elongated cavities 62. This allows the movable masses 64 to move within the radially elongated cavities 62 to thereby allow absorption of torsional vibration.

In a manner described above relative to FIG. 7A, the disc shaped housing 60 is adapted to be rotated in the direction D about rotational axis RA. The movable masses 64 move to the radially outward position P1 due to the acceleration forces of the torsional vibration, and move to the radially inward position of P2 in response to the radial deceleration also caused by the torsional vibration. In such a manner, the movable masses further alter the moment of inertia of the vibration absorber assembly to which the disc shaped housing 60 is applied.

Figure 9:
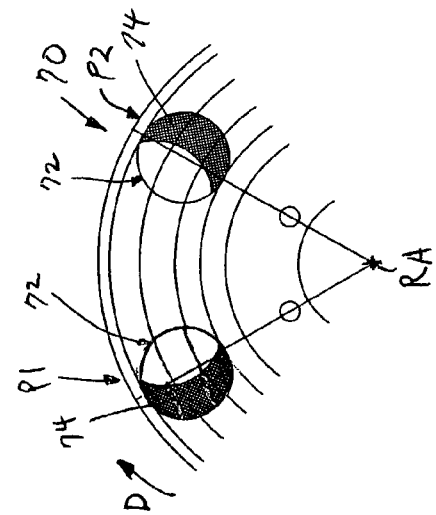
FIG. 9 shows a segment of a disc shaped housing for a vibration absorber assembly in accordance with still another embodiment of the present invention with a volume of liquid in both circumferentially rearward and circumferentially forward positions.

Similarly, FIG. 9 shows a segment of a disc shaped housing 70 that may be applied to a vibration absorber assembly in accordance with another embodiment of the present invention. In this regard, the disc shaped housing 70 is provided with a plurality of cavities 72. As shown, the plurality of cavities 72 are circular in the present embodiment and thus, are not radially elongated. Nonetheless, the plurality of cavities 72 retain a plurality of movable masses 74, which again, are implemented as a volume of liquid such as mercury.

It should be evident that the movable masses 74 move within the plurality of cavities 72 to efficiently absorb torsional vibration. In this regard, the movable masses 74 move to position P1 in response to acceleration forces from the torsional vibration and move to position P2 in response to deceleration forces caused by the torsional vibration as the disc shaped housing 70 is rotated in direction D about rotational axis RA. Again, FIG. 9 shows the movable masses 74 in two different positions within the cavities 72.

Figure 10:
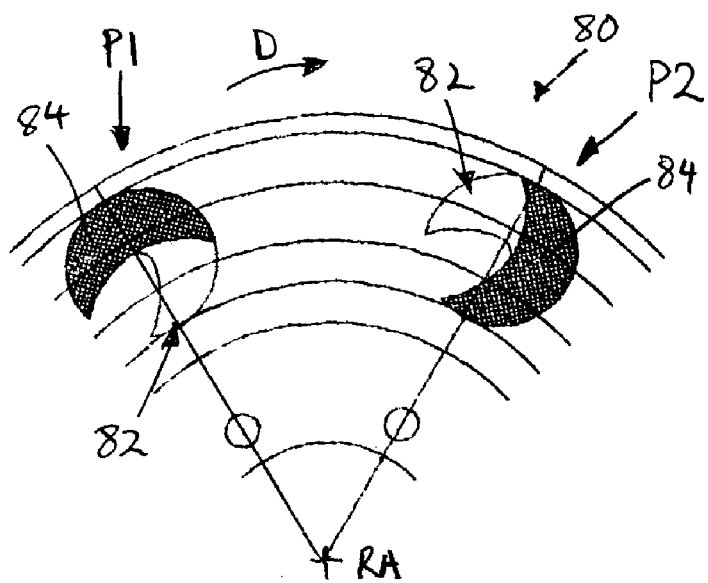
FIG. 10 shows a segment of a disc shaped housing of a vibration absorber assembly having a unique C-shaped cavity in accordance with yet another embodiment of the present invention with a volume of liquid in both radially outward and radially inward positions.

FIG. 10 shows a segment of a disc shaped housing 80 that may be applied to a vibration absorber assembly in accordance with another embodiment of the present invention. The disc shaped housing 80 is provided with a plurality of C-shaped cavities 82 that retain a plurality of movable masses 84, which again, are implemented as a volume of liquid. Like the previous figures, FIG. 10 shows the movable masses 84 in two different positions within the cavities 82. Of course, in other embodiments, the plurality of movable masses may be implemented as a solid, such as metal, sized to move within the C-shaped cavities 82.

In particular, the C-shaped cavities 82 are oriented in the manner shown and partially filled with volumes of liquid that serve as the movable masses 84. The movable masses 84 move to a radially outward position P1 in response to acceleration forces, and move to a radially inward position P2 in response to deceleration forces caused by the torsional vibration as the disc shaped housing 80 is rotated in direction D about rotational axis RA. As can be appreciated by comparing the embodiment of FIG. 10 with the embodiment of FIG. 9, when the movable masses are implemented as volumes of liquid, their movement may be controlled based on the shape of the cavities in which they move.

Figure 11:
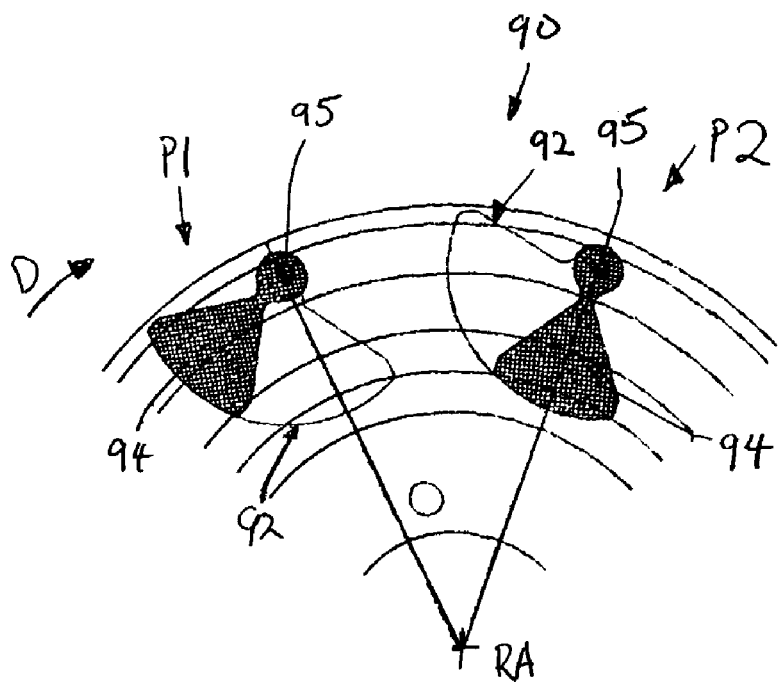
FIG. 11 shows a segment of a disc shaped housing for a vibration absorber assembly in accordance with still another embodiment of the present invention in which the cavity is fan shaped and the movable mass is a pivotable weight.

FIG. 11 shows a segment of a disc shaped housing 90 that may be applied to a vibration absorber assembly in accordance with another embodiment of the present invention. The disc shaped housing 90 is provided with a plurality of fan shaped cavities 92 which retain movable masses 94 that are shaped to movably pivot in the cavities 92. The movable masses 94 are rigid masses in the present embodiment and are pivotably retained in the fan shaped cavities 92 so that the movable masses 94 pivot about pivot head 95.

As shown, the movable masses 94 move to position P1 in response to acceleration forces from the torsional vibration and move to position P2 in response to deceleration forces caused by the torsional vibration as the disc shaped housing 90 is rotated in direction D about rotational axis RA. Again, FIG. 11 shows the movable masses 94 in two different positions within the cavities 92.

Of course, it should be recognized that the various geometries of the plurality of cavities for the disc shaped housing as described in FIGS. 2 to 11 above as well as the implementation of the movable masses, is provided as merely examples thereof. It should be apparent how the present invention can be further modified so that the plurality of cavities and/or movable masses may have different shapes and geometries, and be retained in any appropriate manner while still practicing the present invention.

Figure 12:
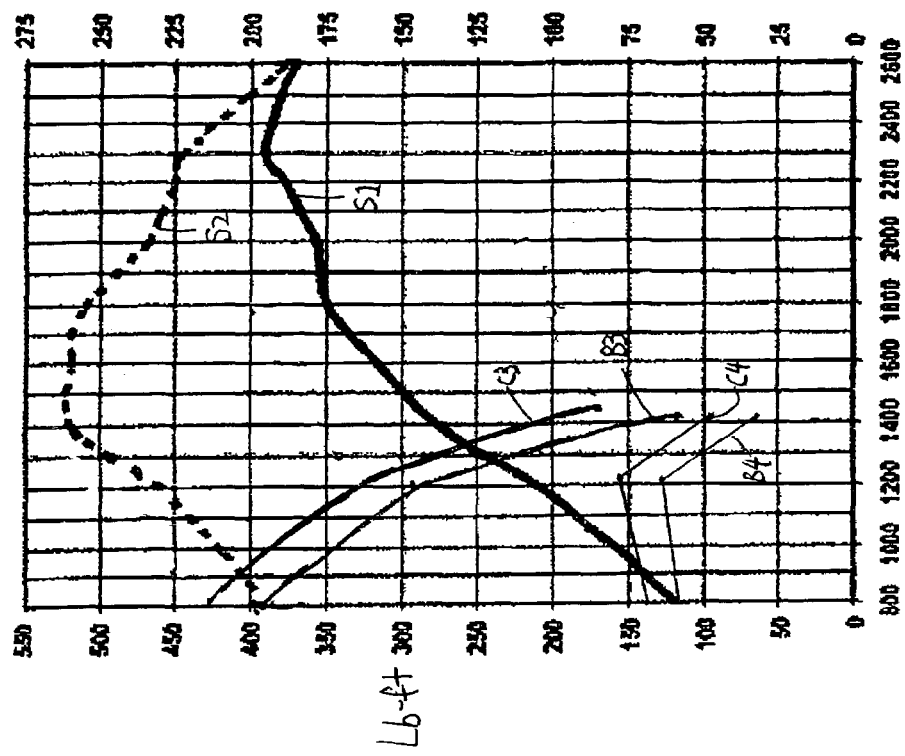
FIG. 12 is a graph showing performance data for an example internal combustion engine to which the present invention was applied.

FIG. 12 shows various performance data for an internal combustion engine that was used to test the effects of a vibration absorber assembly in accordance with the present invention. In particular, a vibration absorber assembly of the type shown in FIG. 7 was attached to the crank shaft of a Navistar/International™ DT466 engine generating a 195 horsepower rating and 520 pound foot of torque at 1400 rpm. The data was obtained for the engine with an air cleaner, less fan, and with alternator and air compressor not charging. Moreover, the tests were performed in accordance with SAEJ 1995 test conditions at 29.61 inch Hg (100 kPa) and 77° F. (25° C.) air temperature.

In FIG. 12, line S1 depicts the horsepower characteristics and values of the engine as published by the manufacturer while line S2 depicts the torque characteristics and values of the engine as also published by the manufacturer. Line B1 depicts the actual horsepower characteristics and values of the internal combustion engine used for the experiment. Similarly, line B2 shows the characteristics and values of the actual torque of the engine used in the present experiment. As shown, the sample engine typically generated similar horsepower and torque throughout its RPM range as published data from the manufacturer. Regardless of the slight deviations, the values B1 and B2 provide the baseline against which the effects of the vibration absorber assembly in accordance with the present invention has on the power and torque characteristics and values of this standard internal combustion engine.

In the above regard, line C1 of FIG. 12 shows the power characteristics and values of the internal combustion engine having the vibration absorber assembly in accordance with the embodiment of the present invention shown in FIG. 7. Line C2 shows the torque characteristics and values of the internal combustion engine utilizing the vibration absorber assembly. As shown, by comparing line C1 to line B1, and line C2 to line B2, the significant improvements in both power and torque of the internal combustion engine by utilizing the vibration absorber assembly in accordance with the present invention can be seen. Although the actual values of increases in horsepower and torque varied depending on the speed of the engine, at each speed of the engine, the engine utilizing the vibration absorber assembly of the present invention exhibited higher levels of both horsepower and torque. Therefore, the vibration absorber assembly of the present invention may be readily used to increase output and efficiency of the internal combustion engines at a lower rate of fuel consumption per brake horsepower hour.

Figure 13:
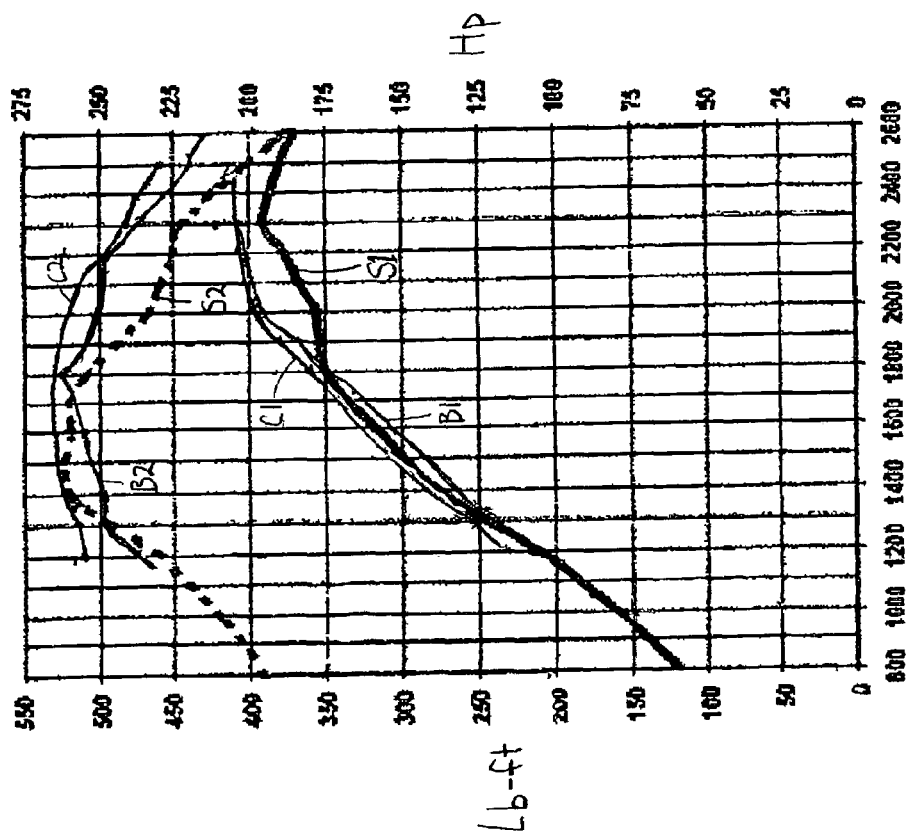
FIG. 13 is another graph showing the performance data of the internal combustion engine of FIG. 12 at approximately one third throttle.

Similarly, FIG. 13 shows the torque characteristics and values of the baseline engine at approximately one third throttle as compared to the torque characteristics and values of the same internal combustion engine at approximately one third throttle utilizing the vibration absorber assembly of the present invention. In particular, line B3 shows the torque characteristics and values for the internal combustion engine operating at one third throttle while line C3 shows the torque characteristics and value for the same internal combustion engine operating at one third throttle with the vibration absorber assembly of the present invention thereon. As can be seen, a significant improvement in torque and fuel efficiency is realized by utilizing the vibration absorber assembly of the present invention as evidenced by the near parallel gap between the lines B3 and C3.

FIG. 13 also shows the relative performance gain in terms of horsepower of the example internal combustion engine that is realized by utilizing the vibration absorber assembly of the present invention. In particular, the line B4 shows the horsepower of the internal combustion engine having a conventional flywheel while the line C4 shows the horsepower of the internal combustion engine having the vibration absorber assembly in accordance with the embodiment of the present invention shown in FIG. 7. As can be seen, a significant improvement in brake horsepower is realized by utilizing the vibration absorber assembly of the present invention as evidenced by the near parallel gap between the lines B4 and C4.

As previously noted, the present invention also improves brake specific fuel consumption (BSFC) performance of the internal combustion engine to which the vibration absorber is applied. At approximately one third throttle and in the 600 RPM range, the BSFC improved from 0.62 pounds per horsepower hour (Lb/HpH) to 0.48 Lb/HpH by utilizing the vibration absorber assembly of the present invention. In the 800 RPM range, the BSFC improved from 0.43 Lb/HpH to 0.32 Lb/HpH, while in the 1200 RPM range, the BSFC improved from 0.28 Lb/HpH to 0.21 Lb/HpH. Finally, in the 1400 RPM range, the brake specific fuel consumption improved from 0.34 Lb/HpH to 0.27 Lb/HpH. Thus, approximately 20 percent increase was observed by utilizing the vibration absorber assembly of the present invention.

In a similar manner, at full throttle and in the 1200 RPM range, the BSFC improved from 0.63 Lb/HpH to 0.39 Lb/HpH by utilizing the vibration absorber assembly of the present invention. In the 1400 RPM range, the BSFC improved from 0.5 Lb/HpH to 0.38 Lb/HpH while in the 1600 RPM range, the brake specific fuel consumption improved from 0.42 Lb/HpH to 0.36 Lb/HpH.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What is claimed is:

1. A vibration absorber assembly comprising:
   a disc shaped housing having a central rotational axis and a plurality of distinct, circumferentially spaced apart, radially elongated cavities, said housing being adapted to be rotated in a predetermined direction, each of said cavities having a first end positioned at a first radial distance from said central rotational axis and a second end positioned at a second radial distance from said central rotational axis, said first radial distance being less than said second radial distance so that said first end is radially closer to said central rotational axis than said second end, said first end being circumferentially forward of said second end in said predetermined direction of rotation, each of said cavities having a greater elongation in the radial direction than in the circumferential direction; and
   a plurality of movable masses, each movable mass being housed in one of said plurality of radially elongated cavities and free to move therein, without restriction at all times primarily in a radial direction between the first end and the second end of said cavities as a result of rotational acceleration and deceleration, respectively, of said housing.

2. The vibration absorber assembly of claim 1, wherein said plurality of movable masses are movable in said plurality of radially elongated cavities to accomplish at least one of the following: absorb torsional vibration and alter moment of inertia of said vibration absorber assembly.

3. The vibration absorber assembly of claim 1, wherein said plurality of movable masses is a plurality of circular rod shaped masses.

4. The vibration absorber assembly of claim 3, wherein each of said movable masses is made of a metal.

5. The vibration absorber assembly of claim 1, wherein said plurality of movable masses comprises movable masses formed of solid materials.

6. The vibration absorber assembly of claim 1, wherein each of said plurality of movable masses is a volume of liquid.

7. The vibration absorber assembly of claim 6, wherein said volume of liquid is mercury.

8. The vibration absorber assembly of claim 1, further comprising a cover plate attached to said housing to retain said plurality of movable masses in said plurality of radially elongated cavities.

9. The vibration absorber assembly of claim 2, wherein said plurality of radially elongated cavities have a kidney bean shape.

10. The vibration absorber assembly of claim 2, wherein each of said plurality of radially elongated cavities are formed with a plurality of radii in a manner that said plurality of movable masses move within said plurality of radii with varying velocity in response to at least one of acceleration and deceleration of said vibration absorber assembly.

11. The vibration absorber assembly of claim 1, wherein said cavities are C-shaped in cross section in a plane perpendicular to said axis and each of said movable masses is made of a sold material and is sized and shaped to be movable within said cavities.

12. The vibration absorber assembly of claim 1, wherein said cavities are fan shaped in cross section in a plane perpendicular to said axis and each of said movable masses is rigid and pivotably retained in each said cavity to be pivotably movable within said cavities.

* * * * *